United States Patent
Lochet et al.

(10) Patent No.: US 8,829,344 B2
(45) Date of Patent: Sep. 9, 2014

(54) ELECTRICAL EQUIPOTENTIAL MURAL APPARATUS

(75) Inventors: Anthony Lochet, Limoges (FR); Jean-Luc Chaumeny, Solignac (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 60 days.

(21) Appl. No.: 13/469,393

(22) Filed: May 11, 2012

(65) Prior Publication Data

US 2012/0287564 A1    Nov. 15, 2012

(30) Foreign Application Priority Data

May 11, 2011    (FR) ...................................... 11 54046

(51) Int. Cl.
H02G 3/14    (2006.01)
H05K 5/03    (2006.01)
H01H 9/12    (2006.01)

(52) U.S. Cl.
CPC ... *H02G 3/14* (2013.01); *H01H 9/12* (2013.01)
USPC ................. 174/66; 174/503; 174/67; 174/51; 361/679.01; 439/536

(58) Field of Classification Search
CPC ......... H02G 3/14; H05K 5/03; H01R 13/447; H01R 13/5213; H01R 13/648; H01H 9/12; H01H 9/02; H01H 9/0264
USPC ............. 174/66, 67, 480, 481, 50, 53, 57, 58, 174/51, 17 R; 220/241, 242, 3.2, 3.3, 4.02; 439/535, 536; 361/679.01, 600, 601
See application file for complete search history.

(56) References Cited

U.S. PATENT DOCUMENTS

| | | | | |
|---|---|---|---|---|
| 3,680,031 | A * | 7/1972 | Schumacher | 174/51 |
| 5,537,294 | A | 7/1996 | Siwinski | |
| 7,279,636 | B2 * | 10/2007 | Oddsen et al. | 174/66 |
| 7,279,637 | B1 * | 10/2007 | O'Young et al. | 174/66 |
| 7,318,732 | B2 * | 1/2008 | Kidman | 174/66 |
| 8,237,064 | B2 * | 8/2012 | Trolese et al. | 174/67 |
| 2008/0006431 | A1 | 1/2008 | Oddsen et al. | |
| 2008/0113535 | A1 | 5/2008 | Kidman | |
| 2010/0133000 | A1 | 6/2010 | Trolese et al. | |

FOREIGN PATENT DOCUMENTS

| | | |
|---|---|---|
| FR | 2852153 A1 | 9/2004 |
| FR | 2950517 B1 | 10/2011 |
| GB | 2387484 A | 10/2003 |
| GB | 2400502 A | 10/2004 |
| GB | 2430562 A | 3/2007 |

OTHER PUBLICATIONS

French Search Report dated Jan. 1, 2012.

* cited by examiner

*Primary Examiner* — Angel R Estrada
(74) *Attorney, Agent, or Firm* — Bachman & LaPointe, P.C

(57) ABSTRACT

A mural electrical apparatus has a metal mounting bracket, a sub-plate, a plate fixed to the sub-plate by a local link, this plate bearing or constituting a conductive portion. This apparatus further has an elastic conductive member provided at least with an orifice, a flexible arm, and a flexible arm, this member being secured to the sub-plate by the local link, crossing the orifice, and the flexible arms protruding in opposite directions to elastically respectively press against the conductive portion and against the bracket, the conductive portion thus, being brought to the same electric potential as the bracket.

9 Claims, 7 Drawing Sheets

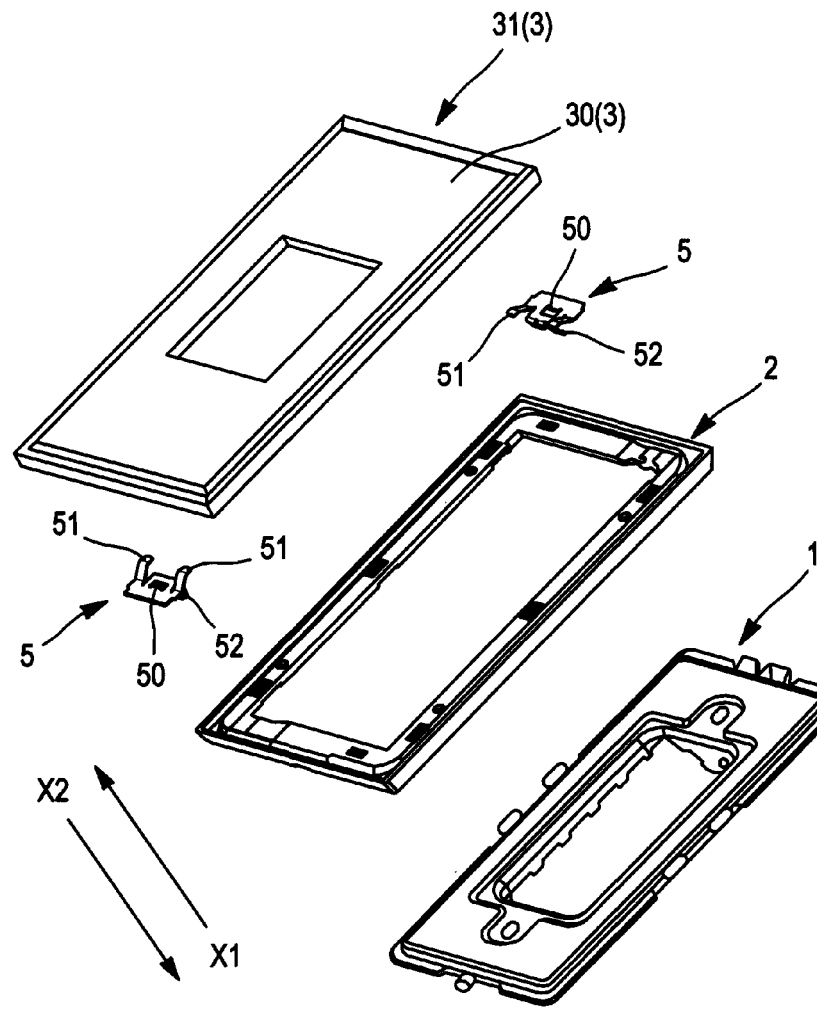
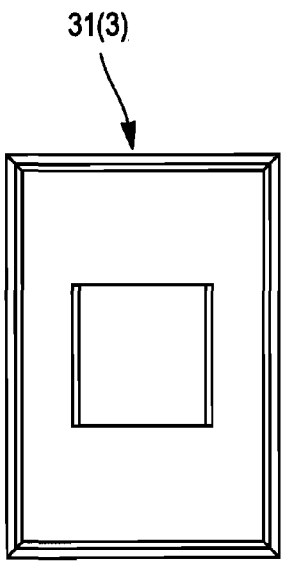
FIG. 2
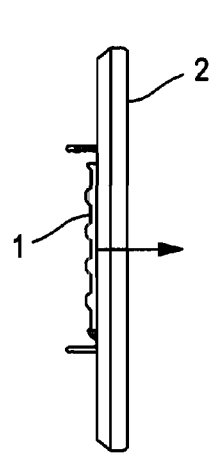
FIG. 3
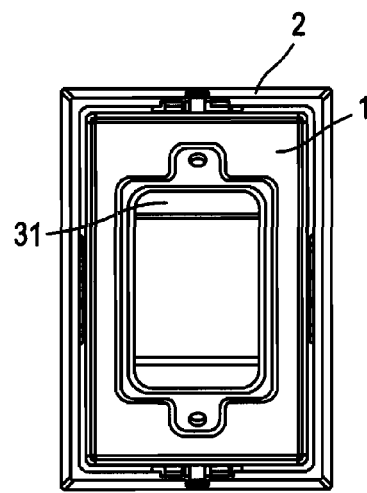
FIG. 4

ELECTRICAL EQUIPOTENTIAL MURAL APPARATUS

BACKGROUND

The invention generally relates to the field of electrical equipment.

More specifically, the invention relates to an electrical mural apparatus comprising at least a metallic mounting bracket, a sub-plate, and an outer mask stacked in this order in a first direction, as well as an elastic conductive member, the outer mask comprising a plate and having at least a conductive portion, the sub-plate being secured to the plate by link means including at least a local link and the elastic conductive member comprising a flexible arm of a first type, each flexible arm of a first type protruding in a second direction opposite to the first direction and elastically pressing against the metallic bracket to form a galvanic contact.

The reinforcement of security standards has lead to a review of the design of these type of apparatuses, which are further well known by the skilled person, and particularly to ensure that at least the conductive portion of their outer mask be brought to the same electric potential as the bracket, which is itself brought to ground potential.

Nevertheless, it is also preferred to ensure that on the one hand the apparatus aesthetic is not damaged, that the number of pieces used for achieving the galvanic contact of the bracket and the outer mask is minimal, and that this contact is made as automatic as possible.

Thus, although it is known, for example from patent FR 2 852 153 of the applicant, to produce a grounding galvanic contact by means of one or several screws, the object of the invention is to provide an electrical apparatus with at least the same safety level by implementing simpler means.

SUMMARY OF THE INVENTION

To this end, the apparatus of the invention, which is further in accordance with the generic definition given in the aforementioned preamble, is substantially characterized in that the elastic conductive member is provided with at least one orifice, a flexible arm of a second type, in that the elastic conductive member is fixed to the sub-plate by at least said local link provided through said orifice, in that each flexible arm of the second type protrudes in the first direction and elastically presses against said conductive portion of the outer mask to form a galvanic contact, and in that the elastic conductive member comprises an elastic hook sized to elastically encircle an inner edge of the sub-plate in the sense of its thickness.

Thanks to this arrangement, the elastic conductive member ensuring the galvanic contact is set and fixed onto the sub-plate during a pre-existent manufacturing step, and by link means provided anyway and essential in the known electrical apparatuses and a correct positioning of the conductive member on the sub-plate before achievement of the local link is ensured by means of the elastic hook.

Thus, although the use of an elastic conductive member to ensure a galvanic contact on printed circuits is for example already described in U.S. Pat. No. 5,537,294, not only does the present invention extend the use of such a conductive member to electrical apparatuses, but it proposes a solution in which this conductive member is maintained in place without resorting to additional means.

In the preferred embodiment of the invention, the conductive member is formed by a cut out and folded metal blank, for example a prior-soaked iron alloy blank in order to exhibit an elastic behavior.

Furthermore, the link means are advantageously arranged at equal distance from the two ends of the conductive member.

The conductive member comprises for example a pair of flexible arms of the second type, these flexible arms of the second type being preferably arranged symmetrically on either side of the median plan constituted by the symmetry plan of the two ends of the conductive member.

It is also judicious to provide this conductive member such that it comprises a pair of flexible arms of the first type, these flexible arms of the first type also being advantageously arranged symmetrically on either side of the median plan constituted by the symmetry plan of the two ends of the conductive member.

The aforementioned local link is for example made by a plastic deformation such as a crimping, or an elastic deformation such as snap-fitting.

In the case where the outer mask further comprises a cover plate linked to the plate opposite the sub-plate and at least partially constituting the conductive portion, the plate is pierced, facing each arm of the second type, with a light sized to make this arm of the second type be elastically pressed against an inner side of the cover plate.

BRIEF DESCRIPTION OF THE DRAWINGS

Other characteristics and advantages of the invention will become apparent in the following description, by way of reference and in no way limiting, with reference to the accompanying drawings, in which:

FIG. 1 is a perspective exploded view of an apparatus in accordance with a first possible embodiment of the invention;

FIG. 2 is a front view of a plate visible on FIG. 1;

FIG. 3 is a profile view of the assembly of a sub-plate and a bracket visible on FIG. 1;

FIG. 4 is a front view of the apparatus visible on FIG. 1, observed from the bracket side;

DETAILED DESCRIPTION OF THE PREFERRED EMBODIMENT(S)

Figure 5:
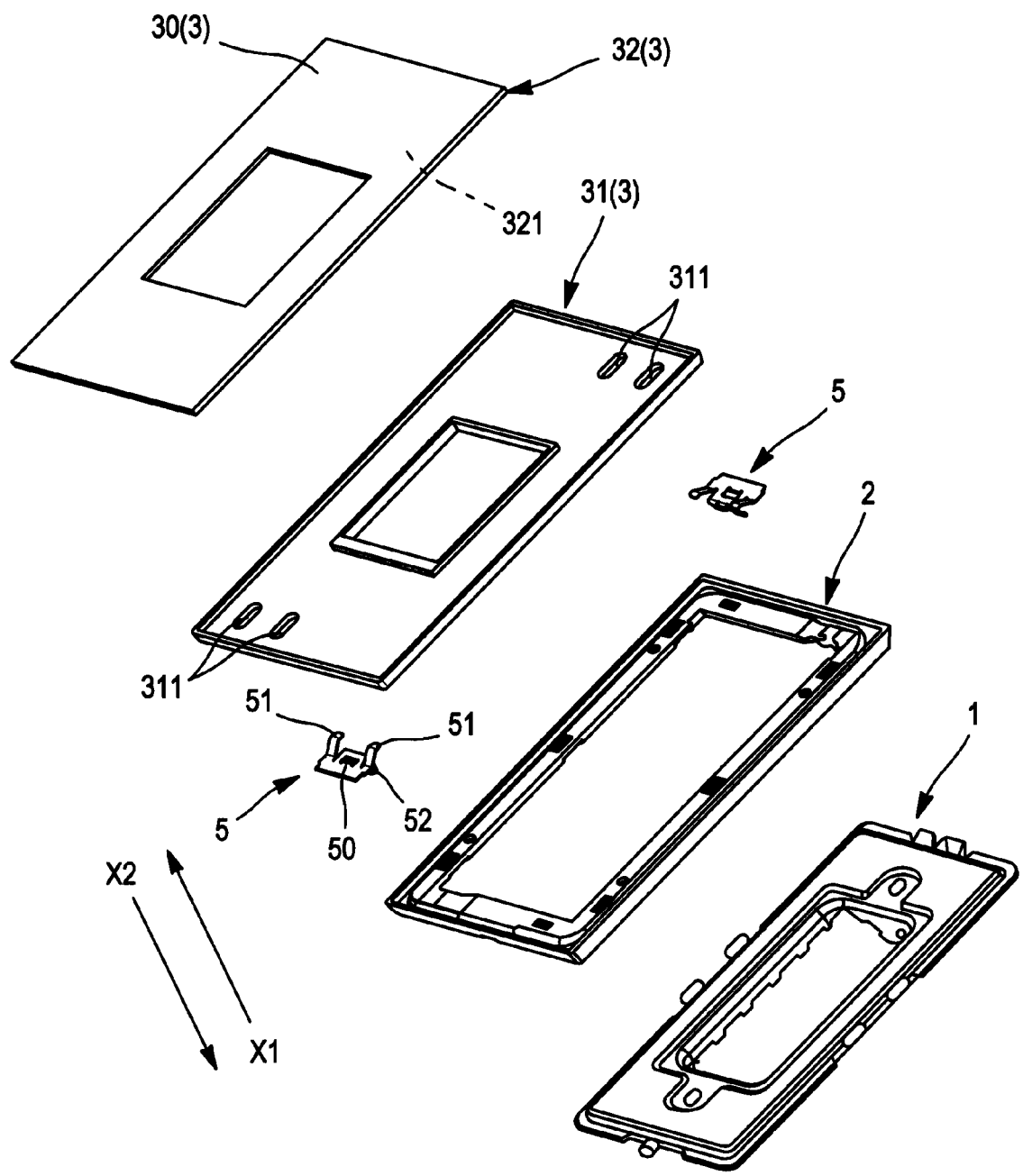
FIG. 5 is a perspective exploded view of an apparatus in accordance with a second possible embodiment of the invention.
Figure 6:
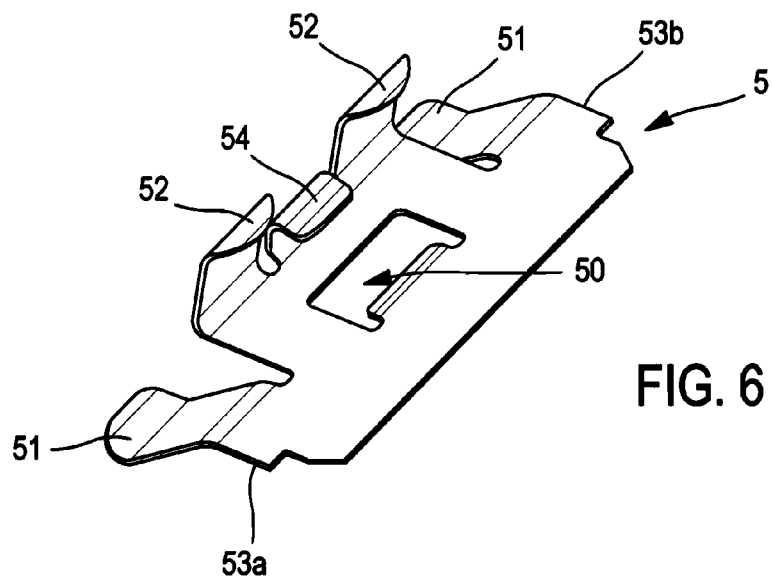
FIG. 6 is an enlarged perspective view of an elastic conductive member usable in an apparatus in accordance with the invention, this member being observed from a first angle of incidence.
Figure 7:
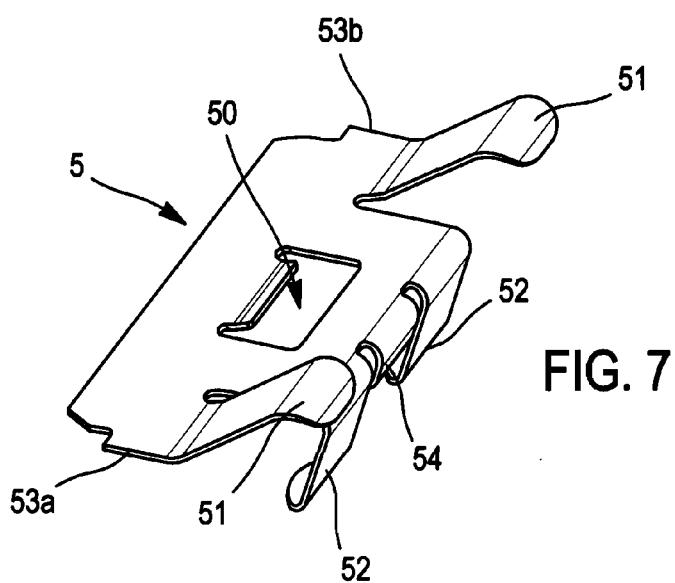
FIG. 7 is an enlarged perspective view of the elastic conductive member illustrated in FIG. 6, this member being observed from a second angle of incidence.
Figure 8:
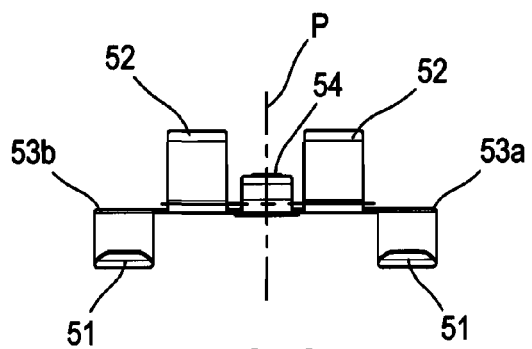
FIG. 8 is a front view of the elastic conductive member illustrated in FIGS. 6 and 7.
Figure 9:
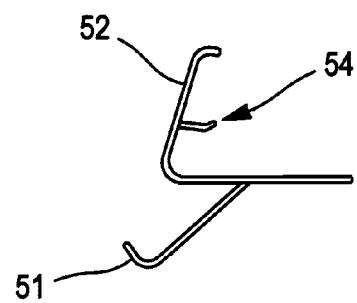
FIG. 9 is a profile view of the elastic conductive member illustrated in FIGS. 6 to 8.
Figure 10:
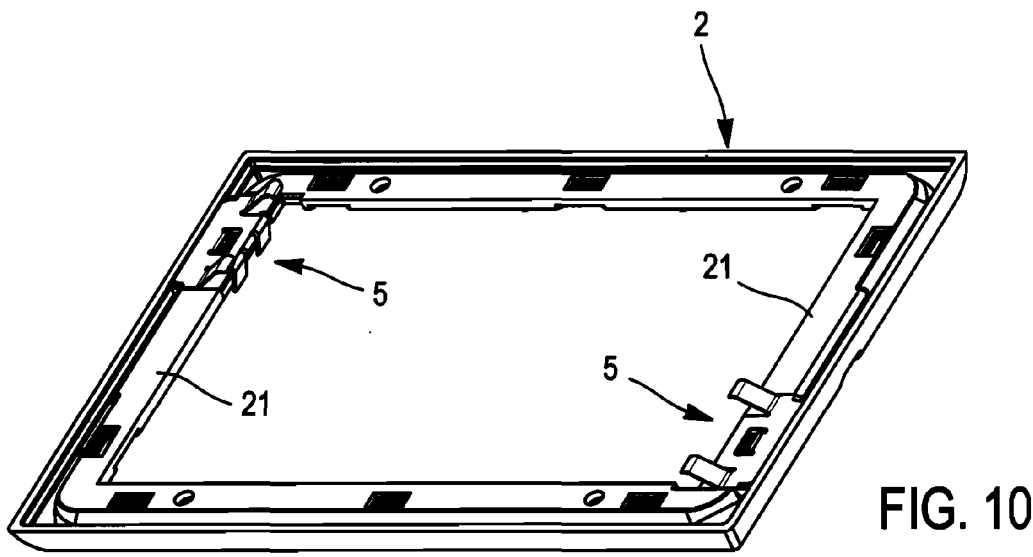
FIG. 10 is a perspective view of a sub-plate usable in an apparatus in accordance with the invention, observed from the side of the plate of this apparatus.
Figure 11:
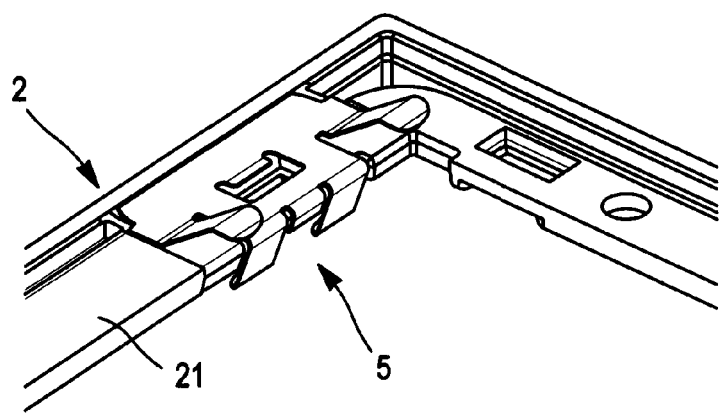
FIG. 11 is a perspective partial view of the sub-plate visible on FIG. 10.
Figure 12:
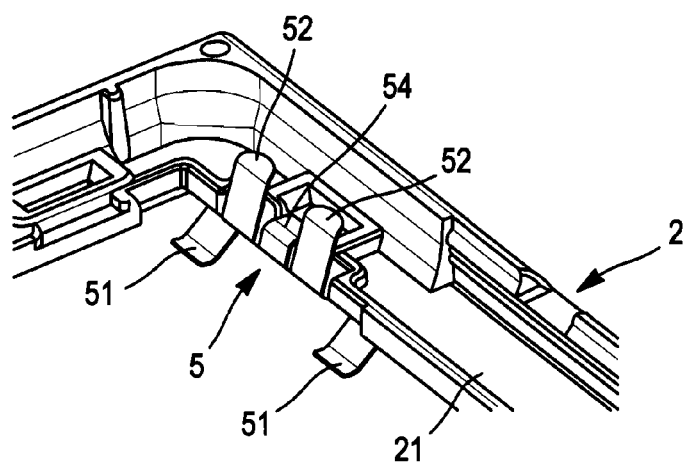
FIG. 12 is an enlarged partial view of the sub-plate visible on FIG. 10, observed from the side of the apparatus bracket.
Figure 13:
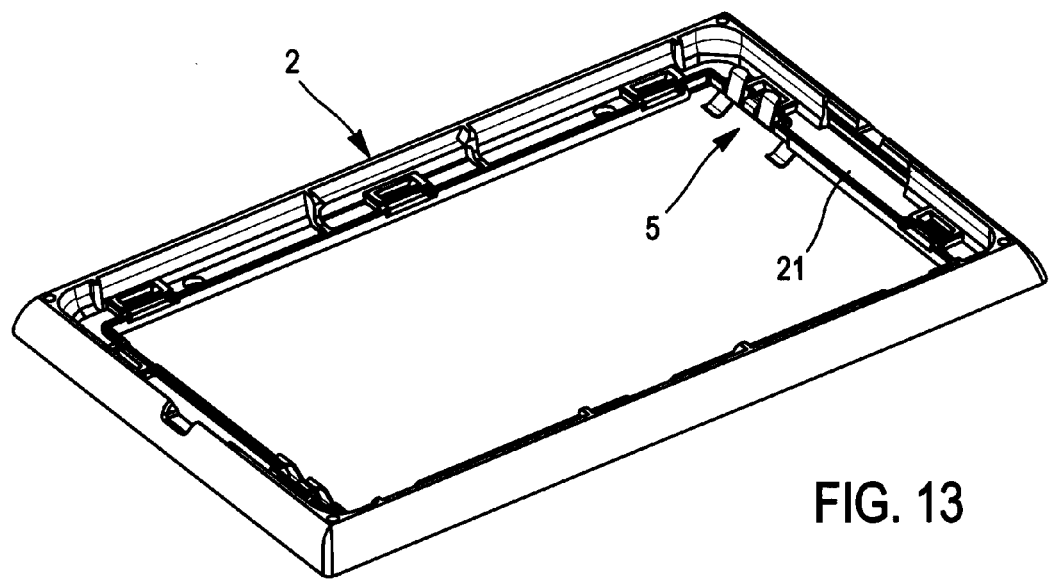
FIG. 13 is a perspective view of the sub-plate visible on FIG. 10, observed from the side of the apparatus bracket.
Figure 14:
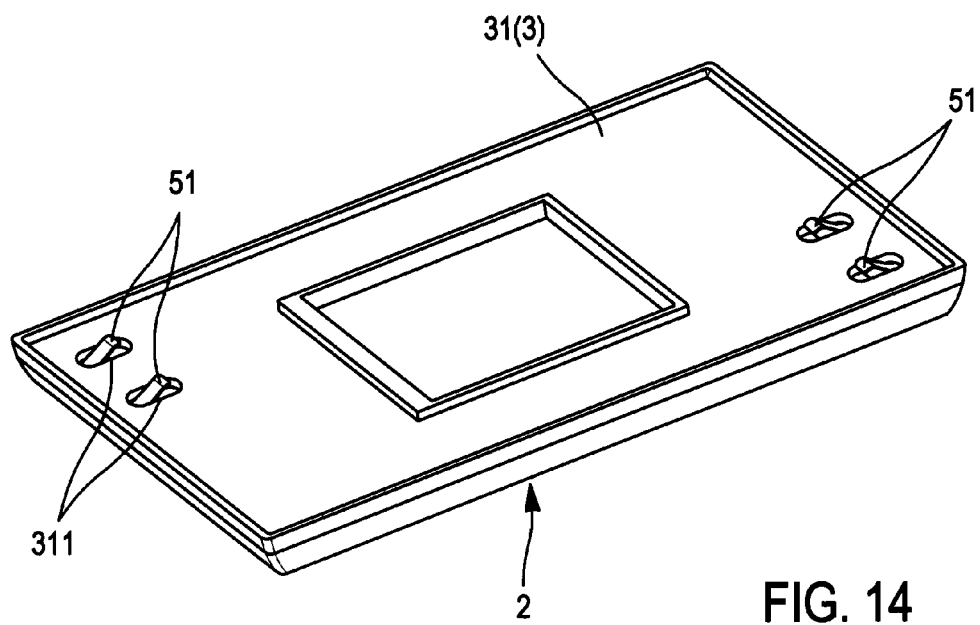
FIG. 14 is a perspective view of the assembly of the plate and sub-plate of an apparatus in accordance with the second embodiment of the invention.
Figure 15:
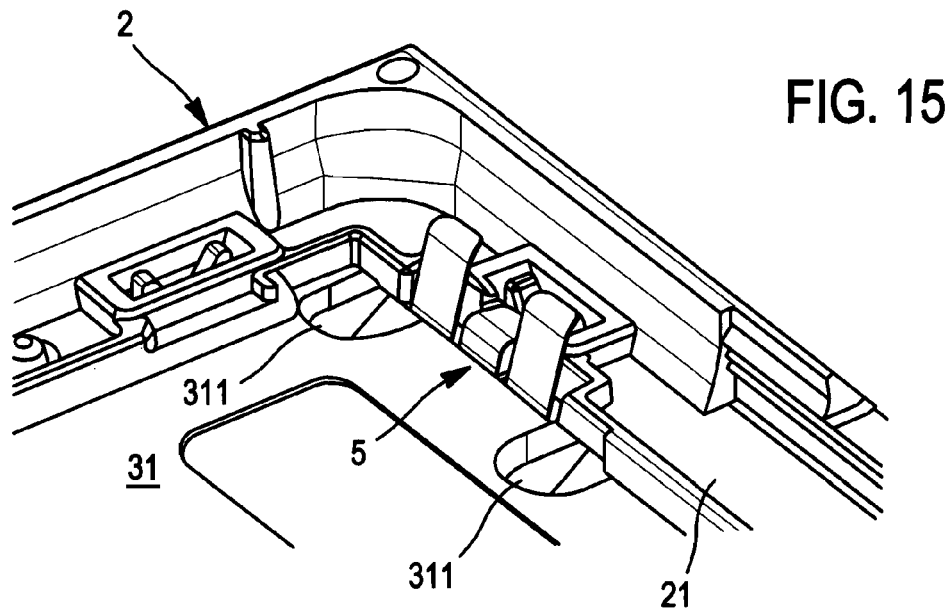
FIG. 15 is an enlarged partial view of the sub-plate visible on FIG. 14, observed from the side of the apparatus bracket.
Figure 16:
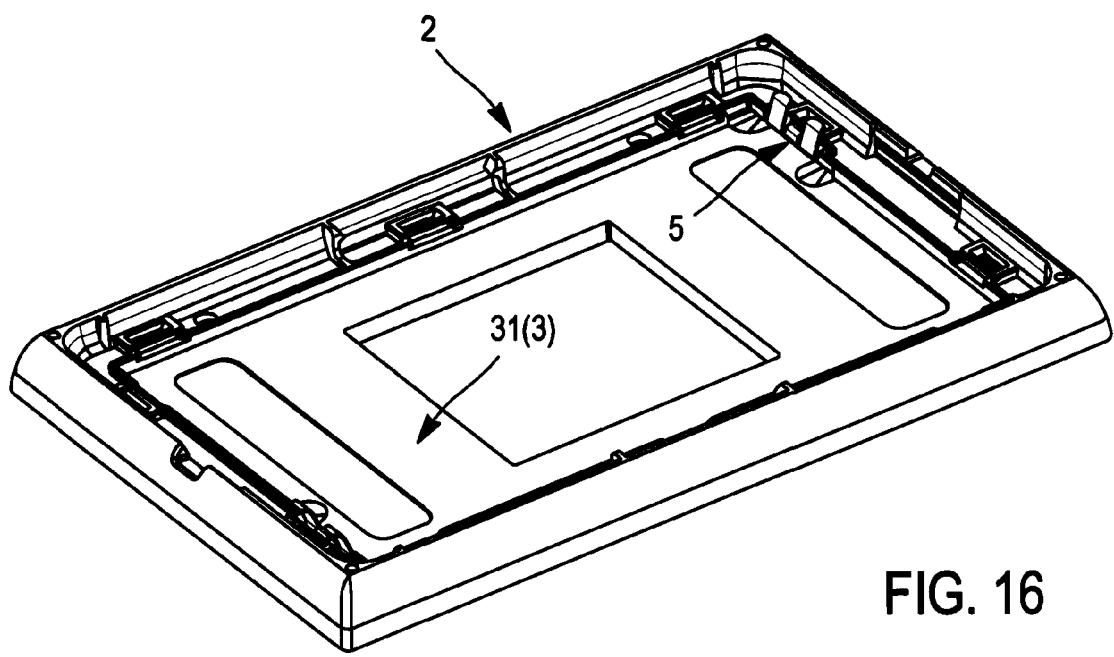
FIG. 16 is a perspective view of the sub-plate visible on FIG. 14, observed from the side of the apparatus bracket.

The main members illustrated on these figs. and mentioned in the present description are identified by references between brackets or not, the references between brackets being given to the assemblies to which belong the members identified by references without brackets.

As aforementioned, the invention relates to an electrical mural apparatus particularly comprising a metal mounting bracket 1, a sub-plate 2, and an outer mask 3, these members being stacked in this order in direction X1.

The outer mask 3, which may be constituted of one or of several pieces, comprises a plate 31 and exhibits at least a conductive portion 30 that is easily accessible for the user.

As is standard, the adjective "conductive" here applies to any member liable to conduct electricity, and particularly any metal or metalized member.

In the embodiment illustrated in FIG. 1, the plate 31 is for example integrally constituted by a metal piece, in which case it constitutes, in its entirety, the conductive portion 30 of the outer mask 3.

However, in the embodiment illustrated in FIGS. 5 and 17 to 19, the outer mask 3 may comprise a non-metallic plate 31, or not entirely metallic, and a metal cover plate 32, in which case the conductive portion 30 of the outer mask 3 is at least partially constituted by the cover plate 32.

The sub-plate 2 is secured to the plate 31 by any appropriate link means 4; these link means 4 including at least a local link 41.

The apparatus of the invention further comprises an elastic conductive member 5 well visible on FIGS. 6 to 9 and for example formed by a cut-out and folded metal blank, then advantageously soaked.

This conductive member 5 is at least provided with one or several orifices 50, of one or several flexible arms 52 of a first type, and of one or several flexible arms 51 of a second type.

Furthermore, this elastic conductive member 5 is fixed to the sub-plate 2 at least thanks to the local link 41 whereby the sub-plate 2 is secured to the plate 31, this local link being, to this end, achieved through the orifice or through one of the orifices 50.

Each flexible arm 51 of the second type is characterized by the fact that it protrudes in the stacking direction X1 and that it is elastically pressed against the conductive portion 30 of the outer mask 3.

However, each flexible arm 52 of the first type is characterized by the fact that it protrudes in the direction X2 opposite to direction X1 and that it is elastically pressed against the bracket 1.

Thanks to this arrangement, the conductive portion 30 of the outer mask 3 is brought by construction to the same electrical potential as the bracket 1.

Figure 17:
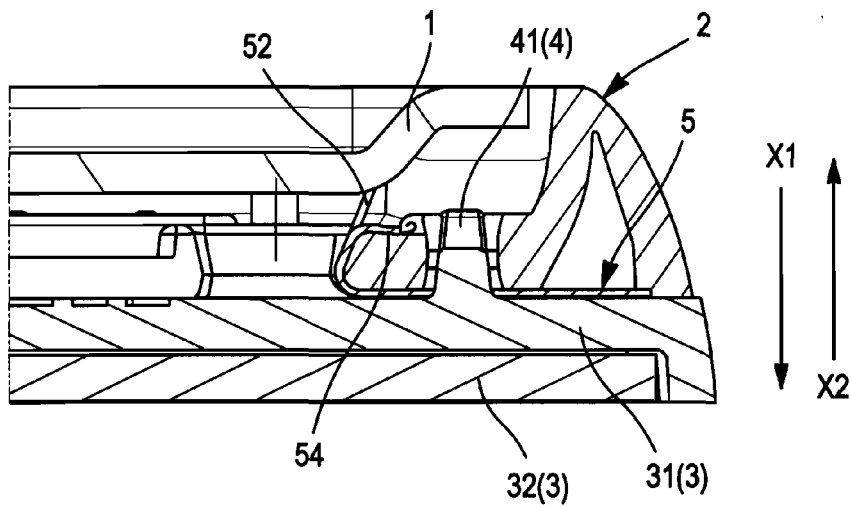
FIG. 17 is an enlarged partial cross-sectional view of an apparatus in accordance with the second embodiment of the invention, the cross-section passing by a local link whereby the sub-plate is secured to the plate.
Figure 18:
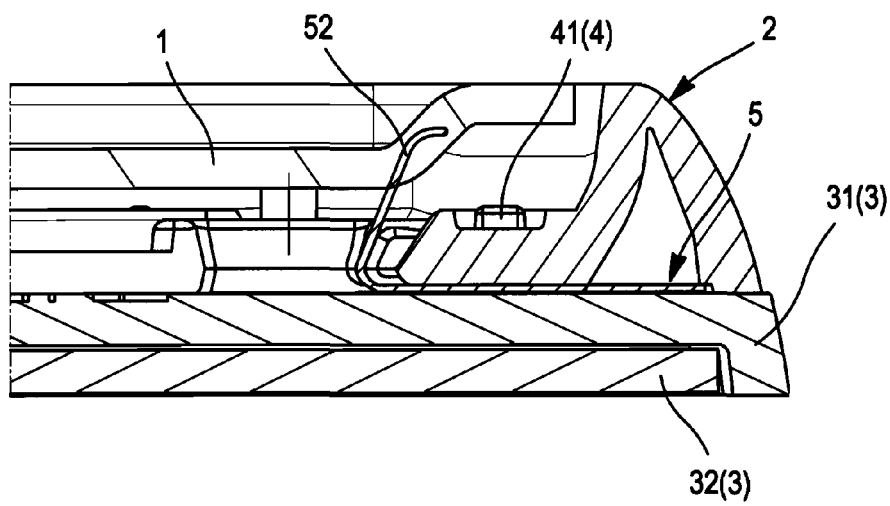
FIG. 18 is an enlarged partial cross-sectional view of an apparatus in accordance with a second embodiment of the invention, the cross-section passing by a flexible arm of the second type.

It should be specified that the arms 52 visible on FIGS. 17 and 18 are not represented in their real position but in the position that they would adopt in the absence of the bracket 1, this representation making it possible to visually appreciate the elastic deformation that they are subjected to in the presence of the bracket 1 and thanks to which they press against this bracket 1.

Figure 19:
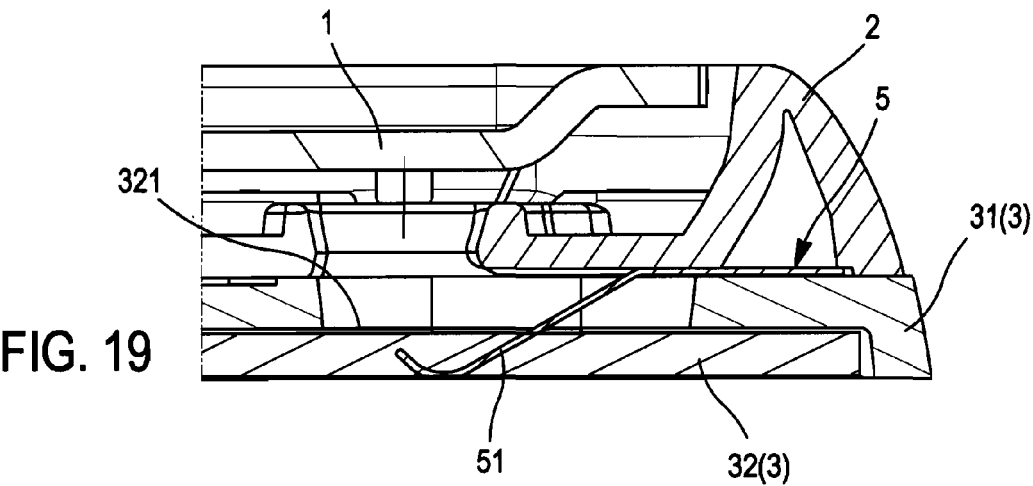
FIG. 19 is an enlarged partial cross-sectional view of an apparatus in accordance with the second embodiment of the invention, the cross-section passing by a flexible arm of the first type.

Likewise, the arm 51 visible on FIG. 19 is not represented in its real position but in the position that it would adopt in the absence of the outer mask 3, this representation making it possible to visually appreciate the elastic deformation that the arms 51 are subjected to in the presence of the outer mask 3 and thanks to which they press against this outer mask.

In order to optimize the distribution of elastic forces exerted by the arms 51 and 52, the conductive member 5 preferably exhibits at least a partial symmetry, but more advantageous still a total symmetry, with respect to a median plan P passing at equal distance from the ends 53a and 53b of this conductive member 5.

For example, the link means 4 thanks to which the sub-plate 2 is secured to the plate 31 may be arranged in the median plan P, or symmetrically with respect to this median plan.

In the embodiment illustrated for reference only and in no way limitative, the conductive member 5 comprises a unique orifice 50 arranged in the median plan P of this member 5, and the local link 41 is formed by a crimping pin crossing through this orifice 50.

More generally, the local link, or each of the local links 41, which crosses one or several orifices 50 of the conductive member 5 is achieved by a plastic deformation, for example in the form of a crimping or by means of folded tabs, or by an elastic deformation, for example in the form of a snap-fitting.

In the illustrated and preferred case where the conductive member 5 comprises a pair of flexible arms 51, these arms 51 are advantageously arranged symmetrically on either side of the median plan P.

Likewise, in the illustrated and preferred case where the conductive member 5 comprises a pair of flexible arms 52, these arms 52 are also advantageously arranged symmetrically on either side of the median plan P.

Preferably, as best shown in FIGS. 6 to 9 and 12, the conductive member 5 further comprises an elastic hook 54 sized to elastically encircle an inner edge 21 of the sub-plate 2 in the sense of its thickness, this hook 54 being for example arranged in the median plan P of this member 5.

In the embodiment illustrated in FIGS. 5 and 17 to 19, the outer mask 3 comprises, in addition to the plate 31 a metal or metalized cover plate 32 constituting at least partially the conductive portion 30 of the outer mask 3.

This arrangement, which reduces the manufacturing constraints of the plate 31, makes it possible to save matter, and particularly metal, without modifying the aesthetic of the apparatus.

The cover plate 32 is fixed on the side of the plate 31 which is upside down, i.e., on the back, of the side if this plate which is linked to the sub-plate 2.

Furthermore, the plate 31 is pierced, facing each arm 51 of the second type, with a light 311 which is sized so that this arm 51 may be elastically pressed against the inner side 321 of the cover plate 32.

More generally, the invention is applicable to all apparatuses independently from the number of pieces that the outer mask 3 comprises.

Particularly, in the case where the outer mask 3 comprises, in addition to the plate 31 and the cover plate 32, an insert intended to increase the rigidity of the plate 31, arranged between this plate and the cover plate 32, and fixed on one side to the plate 31 and from the other to the cover plate 32, this insert is itself pierced with lights in order to make the arms 51 elastically press against the inner side of the cover plate 32.

The invention claimed is:

1. An electrical mural apparatus comprising at least a metal mounting bracket, a sub-plate, and an outer mask stacked in this order in a first direction, an elastic conductive member, the outer mask comprising a plate and having at least a conductive portion, the sub-plate being secured to the plate by link means including at least a local link, the elastic conductive member comprising a flexible arm of a first type, each flexible arm of the first type protruding in a second direction opposite to the first direction and elastically pressing against the metallic mounting bracket to form a galvanic contact, the elastic conductive member being provided with at least one orifice, a flexible arm of a second type, the elastic conductive member being fixed to the sub-plate at least by said local link made through said orifice, each flexible arm of the second type protruding in the first direction and elastically presses against said conductive portion of the outer mask to form a galvanic contact, and the elastic conductive member comprising an elastic hook sized to elastically encircle an inner edge of the sub-plate in a sense of its thickness.

2. The apparatus according to claim 1, the conductive member is formed by a cut-out and folded metal blank.

3. The apparatus according to claim 1, wherein the conductive member exhibits two ends, and the link means are arranged at equal distance from said two ends.

4. The apparatus according to claim 1, wherein the conductive member comprises a pair of flexible arms of the second type.

5. The apparatus according to claim 4, wherein the conductive member exhibits two ends symmetrical with respect to a median plane, and the flexible arms of the second type are arranged symmetrically on either side of the median plane.

6. The apparatus according to claim 1, wherein the conductive member comprises a pair of flexible arms of the first type.

7. The apparatus according to claim 6, wherein the conductive member exhibits two ends symmetrical with respect to a median plane, and the flexible arms of the first type are arranged symmetrically on either side of the median plane.

8. The apparatus according to claim 1, wherein said local link is achieved by a plastic deformation or an elastic deformation.

9. The apparatus according to claim 1, wherein the outer mask further comprises a cover plate linked to a plate opposite to the sub-plate and constituting at least partially said conductive portion, and the plate is pierced, facing each arm of the second type, with a light sized in order to make said arm of the second type elastically press against an inner side of the cover plate.

* * * * *